US012638873B2

(12) United States Patent
Nam et al.

(10) Patent No.: US 12,638,873 B2
(45) Date of Patent: May 26, 2026

(54) POWER MANAGEMENT INTEGRATED CIRCUIT AND METHOD OF OPERATING THE POWER MANAGEMENT INTEGRATED CIRCUIT

(71) Applicant: Samsung Electronics Co., Ltd., Suwon-si (KR)

(72) Inventors: Hyunseok Nam, Suwon-si (KR); Daehan Yu, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 131 days.

(21) Appl. No.: 18/648,798

(22) Filed: Apr. 29, 2024

(65) Prior Publication Data

US 2024/0411333 A1     Dec. 12, 2024

(30) Foreign Application Priority Data

Jun. 12, 2023     (KR) ........................ 10-2023-0075070

(51) Int. Cl.
| | |
|---|---|
| *G05F 1/575* | (2006.01) |
| *G05F 1/571* | (2006.01) |
| *G05F 1/62* | (2006.01) |
| *H02M 1/00* | (2007.01) |
| *H02M 3/158* | (2006.01) |

(52) U.S. Cl.
CPC .............. *G05F 1/575* (2013.01); *G05F 1/571* (2013.01); *H02M 1/0003* (2021.05); *H02M 1/0045* (2021.05); *H02M 1/007* (2021.05); *H02M 1/008* (2021.05); *H02M 3/158* (2013.01); *G05F 1/62* (2013.01)

(58) Field of Classification Search
CPC .... H02M 1/0045; H02M 1/008; H02M 3/156; H02M 1/0067; H02M 3/158; H02M 3/1584; H02M 1/007; G05F 1/575; G06F 1/3243; G06F 1/3206
See application file for complete search history.

(56) References Cited

U.S. PATENT DOCUMENTS

| | | | |
|---|---|---|---|
| 7,602,167 | B2 | 10/2009 | Trafton et al. |
| 8,253,399 | B2 | 8/2012 | Peterson et al. |
| 9,088,176 | B2 | 7/2015 | Hendin et al. |
| 10,073,475 | B2 | 9/2018 | Chou et al. |

(Continued)

FOREIGN PATENT DOCUMENTS

| | | |
|---|---|---|
| KR | 10-2012-0008647 A | 2/2012 |
| KR | 10-2022-0130400 A | 9/2022 |

*Primary Examiner* — Ryan Johnson
(74) *Attorney, Agent, or Firm* — HARNESS, DICKEY & PIERCE, P.L.C.

(57) ABSTRACT

A power management integrated circuit and a method of operating the power management integrated circuit are disclosed. The power management integrated includes an upper regulator circuit that receives a system voltage as an input and outputs a first output voltage; a lower regulator circuit having the first output voltage as an input; and a Kelvin switch circuit connected between the upper regulator circuit and the lower regulator circuit. The Kelvin switch circuit includes a plurality of switches that connect any one of a plurality of upper regulators included in the upper regulator circuit to any one of a plurality of lower regulators included in the lower regulator circuit.

20 Claims, 13 Drawing Sheets

(56)          References Cited

U.S. PATENT DOCUMENTS

| 10,381,925 B2 * | 8/2019 | Lee | G01R 31/40 |
|---|---|---|---|
| 11,709,512 B2 * | 7/2023 | Rajwan | G05F 1/46 |
| | | | 327/540 |
| 11,740,644 B2 | 8/2023 | Gwon et al. | |
| 2023/0009164 A1 | 1/2023 | Georgievski et al. | |
| 2024/0063715 A1 * | 2/2024 | Uan-Zo-li | H02M 1/008 |
| 2025/0167659 A1 * | 5/2025 | Wang | H02J 1/102 |

* cited by examiner

APPLY SYSTEM VOLTAGE TO PMIC — S100

GENERATE PRIMARY OUTPUT VOLTAGE
THROUGH UPPER REGULATOR CIRCUIT — S200

CONTROL KELVIN SWITCH CIRCUIT DISPOSED
BETWEEN LOWER REGULATOR CIRCUIT AND
UPPER REGULATOR CIRCUIT — S300

ADJUST OUTPUT VOLTAGE OF UPPER REGULATOR
BY FEEDING BACK PARASITIC RESISTANCE — S400

POWER MANAGEMENT INTEGRATED CIRCUIT AND METHOD OF OPERATING THE POWER MANAGEMENT INTEGRATED CIRCUIT

CROSS-REFERENCE TO RELATED APPLICATION

This application is based on and claims priority under 35 U.S.C. § 119 to Korean Patent Application No. 10-2023-0075070, filed on Jun. 12, 2023, in the Korean Intellectual Property Office, the disclosure of which is incorporated by reference herein in its entirety.

BACKGROUND

The inventive concepts relate to power management integrated circuits and methods of operating power management integrated circuits. More specifically, the inventive concepts relate to a power management integrated circuits having a sub-regulation structure.

Recently, power management integrated circuits (PMICs) have emerged as an important issue due to an increase in demand for efficient power management of mobile devices such as smartphones and tablet personal computers (PCs). For example, minimizing power consumption and increasing efficiency of mobile devices have become key issues for PMICs. Switching regulators such as pulse width modulation (PWM) Direct Current (DC))-DC converters capable of providing power with high driving voltage and high-power efficiency are used in PMICs.

For example, a PMIC having a sub-regulation structure capable of increasing efficiency by combining a switching regulator and a linear regulator may be used. Recently, as the capacity of a linear regulator increases, there is a concern that performance degradation may occur due to a voltage drop due to power wiring.

SUMMARY

The inventive concepts provide a power management integrated circuit capable of securing high dropout.

Embodiments of the inventive concepts provide a power management integrated circuit that includes an upper regulator circuit that receives a system voltage as an input and outputs a first output voltage, a lower regulator circuit having the first output voltage as an input, and a Kelvin switch circuit connected between the upper regulator circuit and the lower regulator circuit. The Kelvin switch circuit includes a plurality of switches that connect any one of a plurality of upper regulators included in the upper regulator circuit to any one of a plurality of lower regulators included in the lower regulator circuit.

Embodiments of the inventive concepts further provide a power management integrated circuit that includes a first switching regulator and a second switching regulator each receiving a system voltage as an input, a first low dropout (LDO) regulator and a second LDO regulator respectively connected to an output terminal of the first switching regulator or an output terminal of the second switching regulator, a first Kelvin sensing circuit connected between a feedback voltage terminal of the first switching regulator and a feedback voltage terminal of the second switching regulator and a power node of the first LDO regulator, and a second Kelvin sensing circuit connected between the feedback voltage terminal of the first switching regulator and the feedback voltage terminal of the second switching regulator and a power node of the second LDO regulator.

Embodiments of the inventive concepts still further provide a method of operating a power management integrated circuit that includes applying a system voltage to an upper regulator circuit, generating a primary output voltage through the upper regulator circuit; and feedback-sensing the primary output voltage by controlling a Kelvin switch circuit connected between a lower regulator circuit to which the primary output voltage is applied and the upper regulator circuit.

BRIEF DESCRIPTION OF THE DRAWINGS

Example embodiments of the inventive concepts will be more clearly understood from the following detailed description taken in conjunction with the accompanying drawings in which:

FIG. 8 is a circuit diagram illustrating a power management integrated circuit according to some example embodiments;

FIG. 9 is a circuit diagram illustrating a power management integrated circuit according to some example embodiments;

FIG. 10 is a circuit diagram illustrating a power management integrated circuit according to some example embodiments;

FIG. 11 is a circuit diagram illustrating a power management integrated circuit according to some example embodiments;

DETAILED DESCRIPTION

Hereinafter, various embodiments of the inventive concepts are described with reference to the accompanying drawings.

Figure 1:
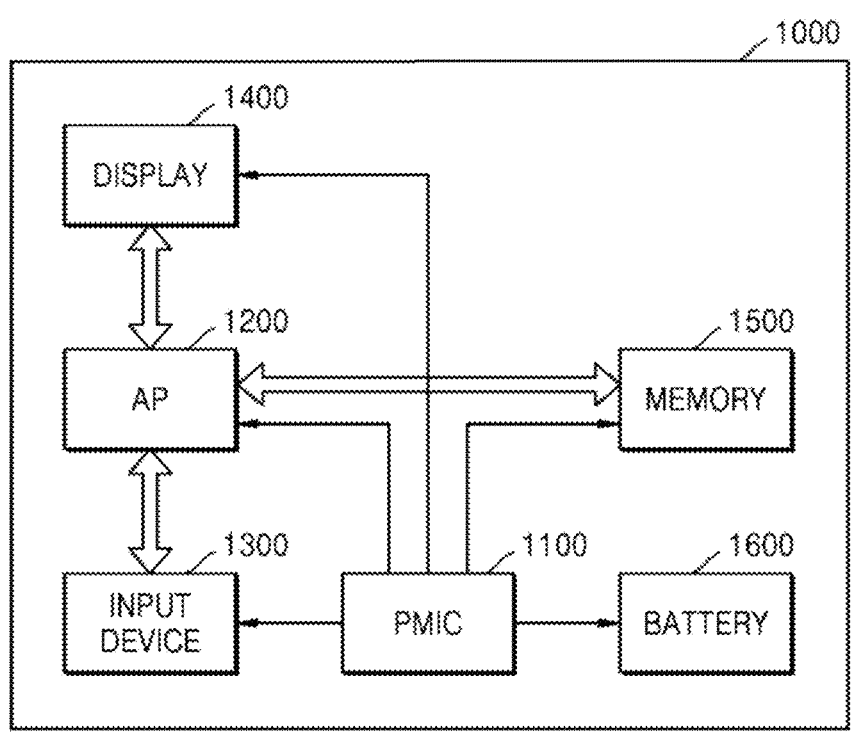
FIG. 1 is a block diagram illustrating an electronic device including a power management integrated circuit according to some example embodiments.

FIG. 1 is a block diagram illustrating an electronic device 1000 including a power management integrated circuit (PMIC) 1100 according to some example embodiments.

Referring to FIG. 1, the electronic device 1000 includes the PMIC 1100, an application processor (AP) 1200, an input device 1300, a display 1400, a memory 1500, and a battery 1600. For example, the electronic device 1000 may be a device included in a vehicle, or the electronic device 1000 may be one of various components constituting a smartphone, a personal computer (PC), a tablet PC, a netbook, an e-reader, a personal digital assistant (PDA), a portable multimedia player (PMP), an MP3 player, an ultra-mobile PC (UMPC), a workstation, a portable computer, a web tablet, a tablet, a wireless phone, a mobile phone, a smartphone, an e-book, a portable game console, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage constituting a data center, a device transmitting and receiving information in a wireless environment, one of various electronic devices constituting a home network, one of various electronic devices constituting a computer network, one of various electronic devices constituting a telematics network, a radio frequency identification (RFID) device, or a computing system. Also, the electronic device 1000 may be a wearable device such as an electronic bracelet or an electronic necklace.

The PMIC 1100 may receive power from the battery 1600, supply and manage power to the AP 1200, the input device 1300, the display 1400, or the memory 1500. The electronic device 1000 may include at least one PMIC 1100. For example, the electronic device 1000 may supply power to the AP 1200, the input device 1300, the display 1400, or the memory 1500 using one PMIC 1100. For example, the electronic device 1000 may include a plurality of PMICs 1100 for individually supplying power to each of the AP 1200, the input device 1300, the display 1400, and the memory 1500.

The PMIC 1100 according to some example embodiments may ensure dropout of a lower regulator included in a lower regulator circuit through an upper regulator circuit, a lower regulator circuit, and a Kelvin switch circuit connecting the upper regulator circuit to the lower regulator circuit. The PMIC 1100 according to some example embodiments may increase (and/or maximize) the efficiency of the lower regulator circuit through a feedback control of an output voltage of the upper regulator circuit considering a current-resistance (IR) drop between the upper regulator circuit and the lower regulator circuit. The PMIC 1100 according to some example embodiments may be applied to all power integrated circuit (IC) products including a PMIC or a serial power wiring structure. A more detailed example of the PMIC 1100 is described below with reference to FIG. 2.

The AP 1200 may control all operations of the electronic device 1000. For example, the AP 1200 may display data stored in the memory 1500 through the display 1400 according to an input signal generated by the input device 1300. For example, the input device 1300 may be implemented as a pointing device, such as a touch pad or a computer mouse, a keypad, or a keyboard.

Figure 2:
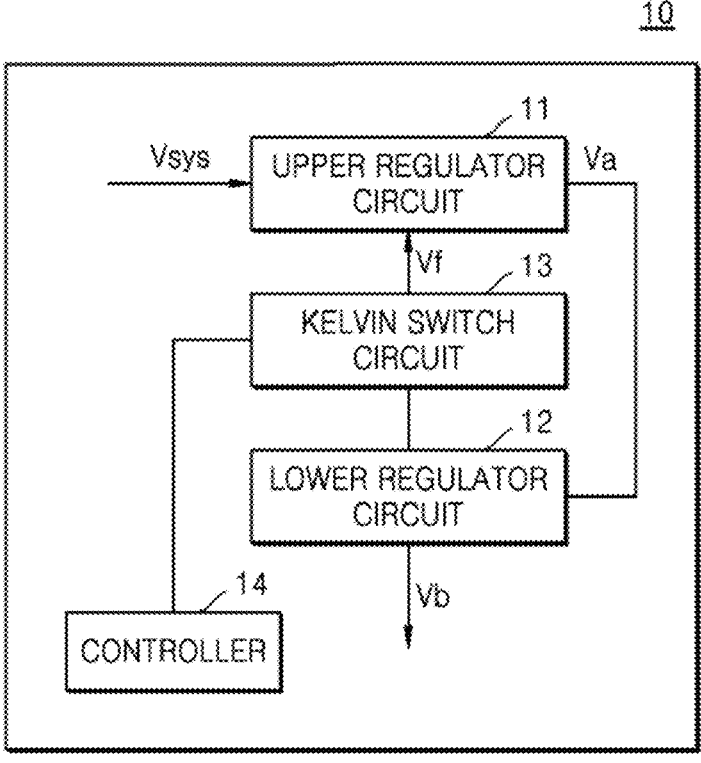
FIG. 2 is a block diagram illustrating a power management integrated circuit according to some example embodiments.

FIG. 2 is a block diagram illustrating a PMIC 10 according to some example embodiments. The PMIC 10 of FIG. 2 may be an example of the PMIC 1100 of FIG. 1, and the PMIC generally described in the disclosure may be illustrated as any one of various embodiments of the PMIC 1100 of FIG. 1.

The PMIC 10 may supply required power to the electronic device 1000 (refer to FIG. 1). The PMIC 10 may receive power from the outside, convert and rectify the power into a stable voltage or current, and may distribute and control the voltage and current. The PMIC 10 may be implemented as a single semiconductor chip or as an assembly of a plurality of semiconductor chips.

The PMIC 10 of FIG. 2 may include an upper regulator circuit 11, a lower regulator circuit 12, a Kelvin switch circuit 13, and a controller 14.

According to some example embodiments, the upper regulator circuit 11 and the lower regulator circuit 12 may be direct current (DC)-DC converters. The upper regulator circuit 11 according to some example embodiments includes a buck converter that generates a power level that is less than input power, a boost converter that generates a power level that is greater than the input power, and a buck-boost converter that generates a power level that is greater or less than the input power. However, the example embodiments are not limited thereto, and various types of direct current conversion may be performed by the upper regulator circuit 11.

According to some example embodiments, the upper regulator circuit 11 and the lower regulator circuit 12 may convert DC power of a certain level into DC power of another level. In some example embodiments, DC power input to the upper regulator circuit 11 may be supplied by the battery 1600 (refer to FIG. 1). In some example embodiments, it is assumed that DC power is converted to DC power of different levels. However, in some example embodiments, even when an alternating current (AC) is supplied from the outside, it may be understood that DC power may be supplied to the upper regulator circuit 11 through an appropriate AC-DC conversion (e.g., using an AC-DC transformer).

Referring to FIG. 2, the upper regulator circuit 11 may receive a system voltage Vsys as an input. The system voltage Vsys may refer to a voltage initially applied to the PMIC 10. The upper regulator circuit 11 may include a plurality of upper regulators. According to some example embodiments, the upper regulator circuit 11 may include a plurality of switching regulators. A switching regulator included in the upper regulator circuit 11 may generate DC power by adjusting a switching cycle of a switching element. For example, the switching regulator may generate a pulse width modulation (PWM) signal using a ramp signal and generate a desired output voltage by stepping up or stepping down an input voltage based on the PWM signal.

The system voltage Vsys may be applied as an input voltage to each of the plurality of upper regulators included in the upper regulator circuit 11. The upper regulator circuit 11 may adjust first the system voltage Vsys. The upper regulator circuit 11 may output a first output voltage Va having a lower level than the system voltage Vsys, which is an input voltage.

The first output voltage Va may be connected to (for example, be applied to) a power node of the lower regulator circuit 12. Referring to FIG. 2, although the first output voltage Va is shown to be directly connected to the lower regulator circuit 12, the first output voltage Va may be connected to a plurality of lower regulators included in the lower regulator circuit 12 through the power node. For example, the lower regulator circuit 12 may have the first output voltage Va as an input. According to some example embodiments, the lower regulator circuit 12 may include a plurality of lower regulators. According to some example embodiments, the lower regulators may be low drop-output (LDO) regulators. An LDO regulator may calculate a difference in voltage applied to the power switch included in the LDO regulator as efficiency. The efficiency of the LDO regulator is determined by the difference between input and output voltages, and thus, the voltage difference should be small to achieve high efficiency. In some example embodiments, a second output voltage Vb output from the lower regulator circuit 12 may be provided to other components connected to the PMIC 10. According to some example embodiments, the second output voltage Vb output from the lower regulator circuit 12 may have a level that is less than the first output voltage Va.

In the description of the example embodiments, the switching regulator may denote an upper regulator included in an upper regulator circuit, and the linear regulator or the LDO regulator may denote a lower regulator included in a lower regulator circuit.

The Kelvin switch circuit 13 may include a plurality of switches. According to some example embodiments, the Kelvin switch circuit 13 may include Kelvin sensing circuits corresponding to the number of lower regulators included in the lower regulator circuit 12. According to some example embodiments, the number of switches included in each Kelvin sensing circuit may correspond to the number of upper regulators included in the upper regulator circuit 11. The Kelvin switch circuit 13 may include a plurality of switches configured to connect any one of the plurality of upper regulators included in the upper regulator circuit 11 to any one of the plurality of lower regulators included in the lower regulator circuit 12.

According to some example embodiments, when the upper regulator circuit 11 includes two upper regulators and the lower regulator circuit 12 includes four lower regulators, the Kelvin switch circuit 13 may include four Kelvin sensing circuits and each of the Kelvin sensing circuits may include two switches. Each of the plurality of Kelvin sensing circuits included in the Kelvin switch circuit 13 may be respectively connected to each of the lower regulators included in the lower regulator circuit 12, and each of the plurality of switches included in the Kelvin sensing circuits may be connected to each of a plurality of upper regulators included in the upper regulator circuit 11. For example, the four Kelvin sensing circuits may be connected to respective different ones of the four lower regulators, and the two switches in a Kelvin sensing circuit may be connected to different respective ones of the two upper regulators.

In some example embodiments, in a process of detecting a voltage at a specific point, when measuring a voltage at a point connected to the specific point without measuring the specific point, an IR drop may occur by a current. The Kelvin sensing may denote accurately measuring a voltage at a corresponding point without an IR drop by additionally placing a sensing line. In example embodiments, the Kelvin switch circuit 13 may refer to a circuit including switches used to apply the Kelvin sensing as described above. In some example embodiments, the Kelvin switch circuit 13 may refer to a switch circuit disposed between the lower regulator circuit 12 and the upper regulator circuit 11 to assist in voltage sensing in order to apply the Kelvin sensing. Depending on which switch is selected among the plurality of switches included in the Kelvin switch circuit 13, an output voltage of any one of the plurality of upper regulators included in the upper regulator circuit 11 may be feedback-sensed. Through the control of a switch included in the Kelvin switch circuit 13, a feedback voltage Vf of a first output voltage Va applied to the lower regulator circuit 12 may be sensed, and by reflecting the sensing result, a voltage applied to the lower regulator circuit 12 may be improved or optimized. According to some example embodiments, a voltage terminal to which the feedback voltage Vf is applied may be referred to as a feedback voltage terminal. In the PMIC 10 according to some example embodiments, the effect of parasitic resistance may be reduced through a feedback sensing using the Kelvin switch circuit 13.

The PMIC 10 according to some example embodiments may include the Kelvin switch circuit 13 that is reconfigurable and the controller 14 capable of controlling the Kelvin switch circuit 13. In some example embodiments, the meaning of being reconfigurable may denote that a desired voltage may be output without changing hardware according to specifications of a power rail of an electronic device connected to a PMIC. For example, it may denote that an upper regulator included in the different upper regulator circuit 11 and a lower regulator included in the lower regulator circuit 12 may be connected only by controlling switches included in the Kelvin switch circuit 13. Referring to FIG. 2, the feedback voltage Vf controlling the first output voltage Va of the upper regulator circuit 11 may be connected to the upper regulator circuit 11 from the Kelvin switch circuit 13.

The controller 14 may control signals applied to a plurality of switches included in the Kelvin switch circuit 13. Referring to FIG. 2, although the controller 14 is shown as being included inside the PMIC 10, the controller 14 may be disposed outside the PMIC 10. According to some example embodiments, the controller 14 may control some of the plurality of switches included in the Kelvin switch circuit 13 to turn on and control the others to turn off. According to example embodiments, the controller 14 may control a connection structure between the upper regulator circuit 11 and the lower regulator circuit 12 according to power required for other components to which the PMIC 10 is connected. According to some example embodiments, the controller 14 may control to turn on a switch determined by information stored in a one time programmable (OTP) memory device (not shown). According to some example embodiments, the PMIC 10 may be connected to various components to apply power thereto, and the configurations of the upper regulator circuit 11 and the lower regulator circuit 12 applied to each component may be different. According to some example embodiments, power provision information corresponding to each component and a connection structure of regulator circuits may be included in the OTP memory device. Code information included in the OTP memory device may include information on the configurations of the upper regulator circuit 11 and the lower regulator circuit 12, and by applying the information, a connection structure suitable for each component may be controlled. The controller 14 may control a signal applied to a plurality of switches in response to power provision information corresponding to a component connected to the PMIC 10. According to some example embodiments, the power provision information may be power value information of an electronic device connected to the PMIC 10. According to some example embodiments, the power provision information may be information related to a power range that changes depending on the arrangement of power rails included in the electronic device.

When a power rail of an electronic device to which the PMIC 10 is connected is determined, the controller 14 may fix power information corresponding to the power rail by using information included in the OTP memory device, and may perform a switch control for connecting the upper regulator circuit 11 and the lower regulator circuit 12 by setting a connection structure thereof corresponding to the power information.

It may be understood that the controller 14 may be implemented as a central processing unit (CPU), an arithmetic logic unit (ALU) that performs arithmetic and logic operations, bit shifts, etc., a digital signal processor (DSP), a microprocessor, an application specific integrated circuit (ASIC), a control logic, etc., but the controller 14 is not limited thereto. In some example embodiments, the controller 14 may include a state machine composed of a plurality of logic gates and include a processor and a memory that stores instructions executed by the processor.

According to some example embodiments, the controller 14 may overall control the PMIC 10 itself or components (e.g., the upper regulator circuit 11, the lower regulator circuit 12, and the Kelvin switch circuit 13) included in the PMIC 10. An example of the PMIC 10 corresponding to FIG. 2 is described later in detail with reference to FIGS. 7 and 8.

Figure 3:
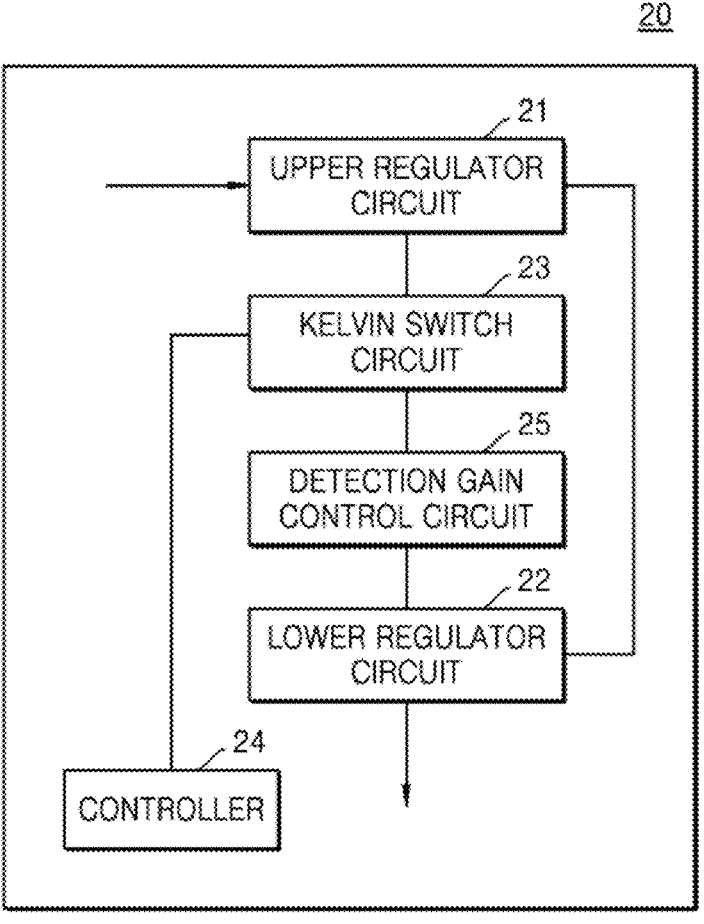
FIG. 3 is a block diagram illustrating a power management integrated circuit according to some example embodiments.

FIG. 3 is a block diagram illustrating a PMIC 20 according to some example embodiments.

The PMIC 20 of FIG. 3 may include an upper regulator circuit 21, a lower regulator circuit 22, a Kelvin switch circuit 23, a controller 24, and a detection gain control circuit 25. The upper regulator circuit 21, the lower regulator circuit 22, the Kelvin switch circuit 23, and the controller 24 of FIG. 3 may respectively correspond to the upper regulator circuit 11, the lower regulator circuit 12, the Kelvin switch circuit 13, and the controller 14 of FIG. 2. In the description of FIG. 3, descriptions of the same components as those described above with reference to FIG. 2 will be omitted.

Referring to FIG. 3, the detection gain control circuit 25 is disposed between the Kelvin switch circuit 23 and the lower regulator circuit 22. The detection gain control circuit 25 may have a structure in which a plurality of resistors are connected in series. According to some example embodiments, the Kelvin switch circuit 23 may be connected between a plurality of resistors included in the detection gain control circuit 25. A gain value of a voltage may be controlled by adjusting a value of a resistor included in the detection gain control circuit 25. For example, the detection gain control circuit 25 may adjust a gain value of a feedback voltage output from the Kelvin switch circuit 23 to the upper regulator circuit 21. Accordingly, a voltage of the lower regulator circuit 22 may be more readily controlled. The voltage control of the lower regulator circuit 22 will be described in detail with reference to FIG. 9.

Figure 4:
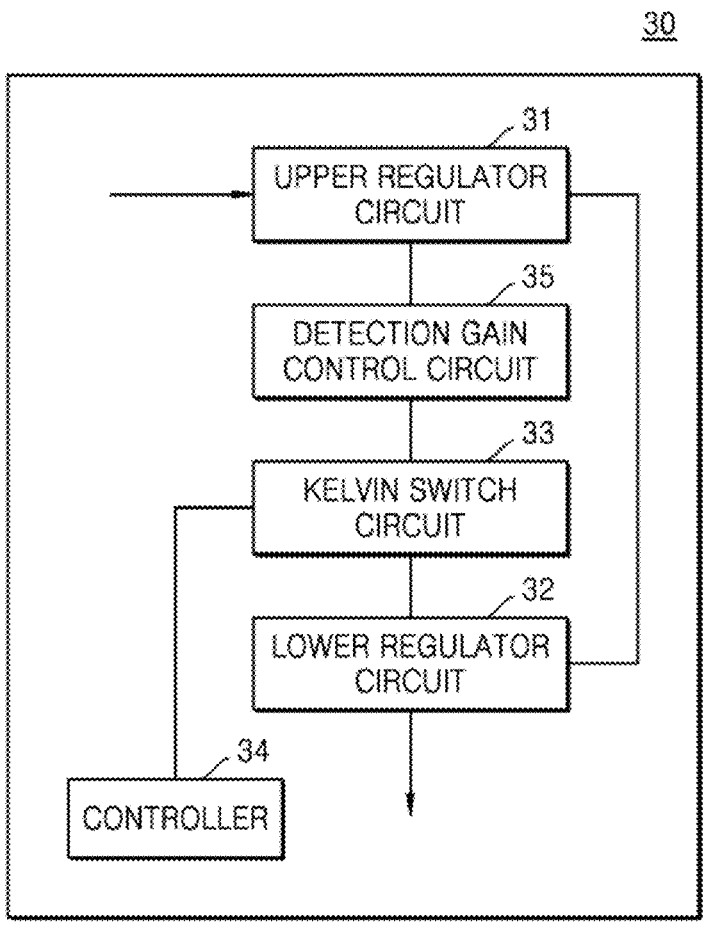
FIG. 4 is a block diagram illustrating a power management integrated circuit according to some example embodiments.

FIG. 4 is a block diagram illustrating a PMIC 30 according to some example embodiments.

The PMIC 30 of FIG. 4 may include an upper regulator circuit 31, a lower regulator circuit 32, a Kelvin switch circuit 33, a controller 34, and a detection gain control circuit 35. The upper regulator circuit 31, the lower regulator circuit 32, the Kelvin switch circuit 33, and the controller 34 of FIG. 4 may correspond to the upper regulator circuit 11, the lower regulator circuit 12, the Kelvin switch circuit 13, and the controller 14 of FIG. 2, respectively. In the description of FIG. 4, descriptions of the same components as those described above with reference to FIG. 2 will be omitted.

Referring to FIG. 4, the detection gain control circuit 35 is disposed between the Kelvin switch circuit 33 and the upper regulator circuit 31. Compared to FIG. 3, the position of the detection gain control circuit 35 in the PMIC 30 may be different from the position of the detection gain control circuit 25 in the PMIC 20. The detection gain control circuit 35 is connected to a feedback voltage terminal of the upper regulator circuit 31 to adjust a detection gain of a feedback voltage, which will be described in detail with reference to FIG. 10. For example, the detection gain control circuit 35 may adjust a gain value of a feedback voltage output from the Kelvin switch circuit 33 to the upper regulator circuit 31.

Figure 5:
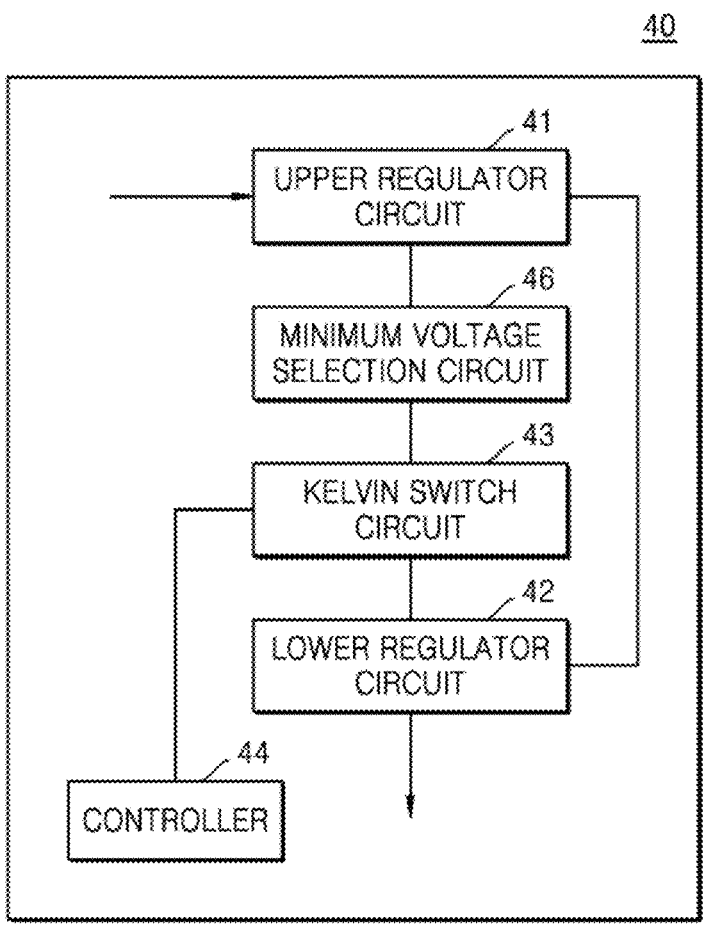
FIG. 5 is a block diagram illustrating a power management integrated circuit according to some example embodiments.

FIG. 5 is a block diagram illustrating a PMIC 40 according to some example embodiments. The PMIC 40 of FIG. 5 may include an upper regulator circuit 41, a lower regulator circuit 42, a Kelvin switch circuit 43, a controller 44, and a minimum voltage selection circuit 46. The upper regulator circuit 41, the lower regulator circuit 42, the Kelvin switch circuit 43 and the controller 44 of FIG. 5 may correspond to the upper regulator circuit 11, the lower regulator circuit 12, the Kelvin switch circuit 13, and the controller 14 of FIG. 2, respectively. In the description of FIG. 5, descriptions of the same components as those described above with reference to FIG. 2 will be omitted.

The minimum voltage selection circuit 46 may be disposed between the Kelvin switch circuit 43 and the upper regulator circuit 41. According to some example embodiments, in the PMIC 40 according to FIG. 5, a plurality of lower regulators may be connected to at least one upper regulator included in the upper regulator circuit 41. According to some example embodiments, the minimum voltage selection circuit 46 may select a lower regulator having the highest voltage drop among a plurality of lower regulators.

When a plurality of lower regulators are connected to one upper regulator, values of load currents flowing through lower regulators may all be different. As the values of load currents increases, a parasitic resistance value increases and a voltage drop may increase. Accordingly, the minimum voltage selection circuit 46 may improve or optimize the dropout voltage by selecting the lowest voltage (e.g., the voltage that drops the most), which will be described in detail with reference to FIG. 11.

Figure 6:
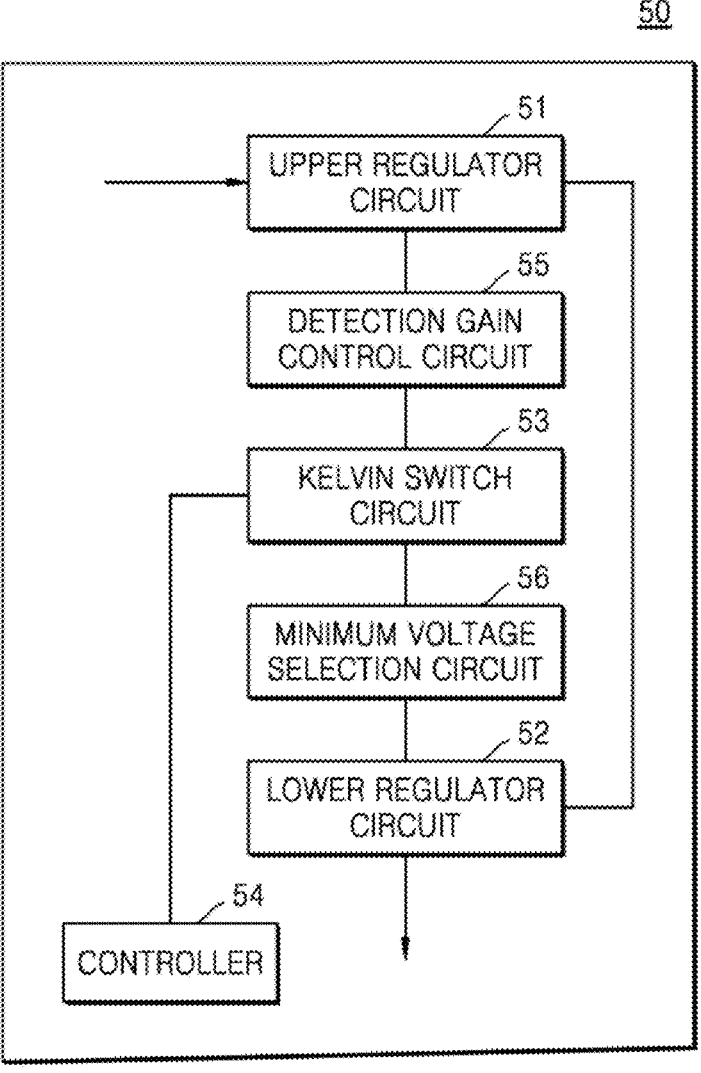
FIG. 6 is a block diagram illustrating a power management integrated circuit according to some example embodiments.

FIG. 6 is a block diagram illustrating a PMIC 50 according to some example embodiments.

The PMIC 50 of FIG. 6 may include an upper regulator circuit 51, a lower regulator circuit 52, a Kelvin switch circuit 53, a controller 54, a detection gain control circuit 55, and a minimum voltage selection circuit 56. The upper regulator circuit 51, the lower regulator circuit 52, the Kelvin switch circuit 53, and the controller 54 of FIG. 6 may correspond to the upper regulator circuit 11, the lower regulator circuit 12, the Kelvin switch circuit 13, the controller 14 of FIG. 2, respectively, the detection gain control circuit 55 of FIG. 6 may correspond to the detection gain control circuit 35 of FIG. 4, and the minimum voltage selection circuit 56 of FIG. 6 may correspond to the minimum voltage selection circuit 46 of FIG. 5. In the description of FIG. 6, the descriptions of the same components as those described in the previous drawings are omitted.

Referring to FIG. 6, the PMIC 50 may include both the detection gain control circuit 55 and the minimum voltage selection circuit 56. The PMIC 50 according to some example embodiments may adjust a detection gain of an output voltage of the upper regulator circuit 51 that is fed back through the detection gain control circuit 55 and may select a lower regulator having the lowest voltage among a plurality of lower regulators using the minimum voltage selection circuit 56.

The minimum voltage selection circuit 56 included in the PMIC 50 according to example embodiments, in order to feedback-sense the output voltage of the upper regulator circuit, may maintain a voltage level through regulating a voltage at an input terminal of the lower regulator circuit connected to the load terminal based on the lowest voltage. The PMIC 50 according to some example embodiments may perform voltage control to reduce (and/or minimize) power loss due to an IR drop and perform a compensation operation based on a voltage having the largest loss.

Figure 7:
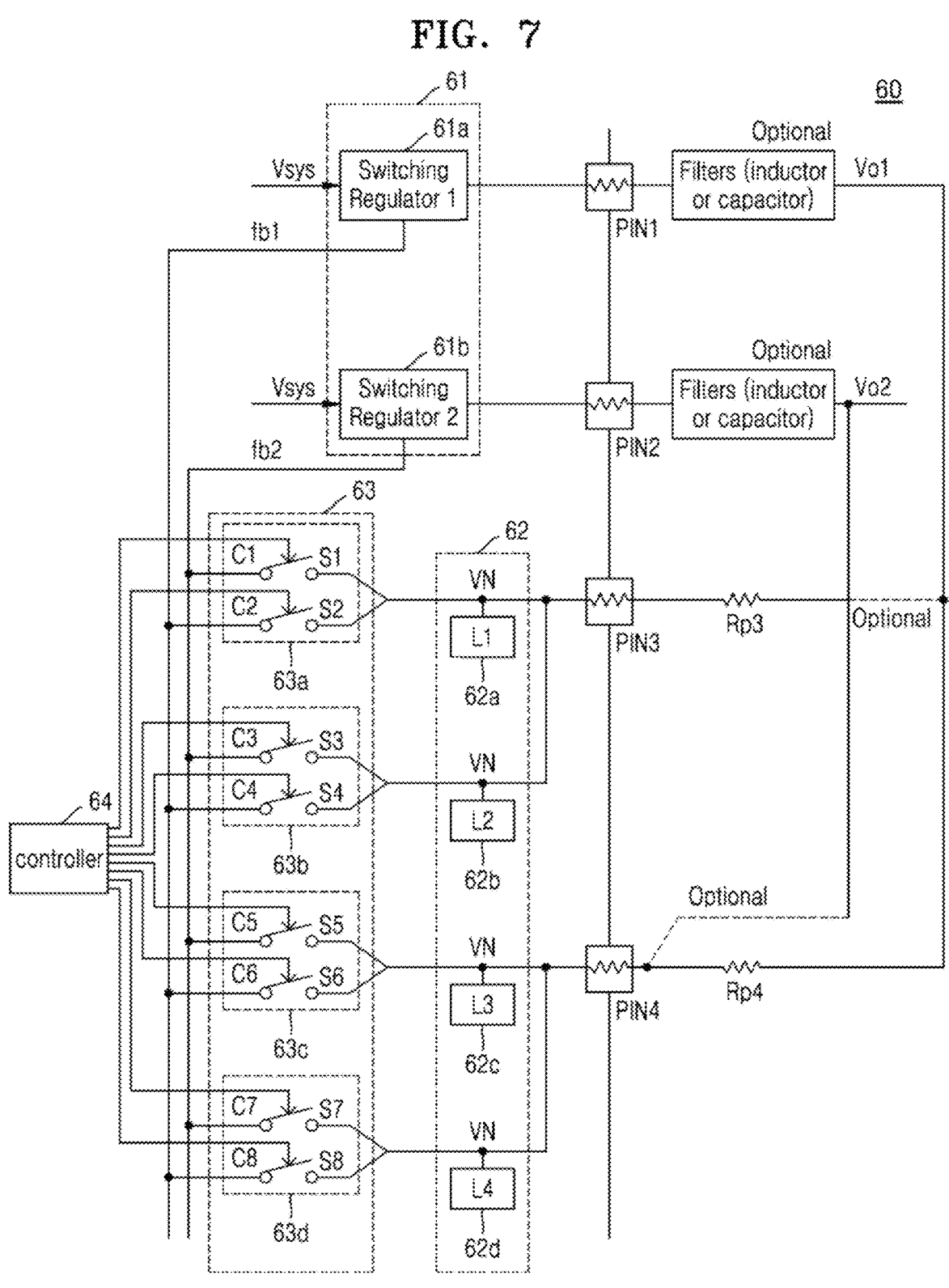
FIG. 7 is a circuit diagram illustrating a power management integrated circuit according to some example embodiments.

FIG. 7 is a circuit diagram illustrating a PMIC 60 according to some example embodiments.

Referring to FIG. 7, an example of a circuit diagram of the PMIC 60 including an upper regulator circuit 61, a lower regulator circuit 62, a Kelvin switch circuit 63, and a controller 64 is shown. The upper regulator circuit 61 may include a first switching regulator 61a and a second switching regulator 61b. The lower regulator circuit 62 may include a first LDO regulator (L1) 62a, a second LDO regulator (L2) 62b, a third LDO regulator (L3) 62c, and a fourth LDO regulator (L4) 62d. The Kelvin switch circuit 63 may include a first Kelvin sensing circuit 63a, a second Kelvin sensing circuit 63b, a third Kelvin sensing circuit 63c, and a fourth Kelvin sensing circuit 63d. The first Kelvin sensing circuit 63a may include a first switch S1 and a second switch S2. The second Kelvin sensing circuit 63b may include a third switch S3 and a fourth switch S4. The third Kelvin sensing circuit 63c may include a fifth switch S5 and a sixth switch S6. The fourth Kelvin sensing circuit 63d may include a seventh switch S7 and an eighth switch S8.

Referring to FIG. 7, a system voltage Vsys may be applied to each of the first switching regulator 61a and the second switching regulator 61b included in the upper regulator circuit 61. According to some example embodiments, although the same system voltage Vsys is shown as being applied to the first switching regulator 61a and the second switching regulator 61b included in the upper regulator circuit 61, system voltages having different levels from each other may be applied to each of the first switching regulator 61a the second switching regulator 61b. The first switching regulator 61a and the second switching regulator 61b respectively may output first output voltages Vo1 and Vo2 through pins PIN1 and PIN2 connected to the respective switching regulators and a selectively provided filter. For example, the filters may be an inductor or a capacitor. The first output voltages Vo1 and Vo2 may be applied to power nodes VN of the lower regulators included in the lower regulator circuit 62 via pins PIN3 and PIN4 for connection with the lower regulator circuit 62.

In FIG. 7, optional may denote that, as described above, the connection structures of the upper regulator circuit and the lower regulator circuit may be different depending on the power rail of an electronic device connected to the PMIC 60, and feedback loops in a connecting process may each be different. Optional may denote that a connection structure between the upper regulator circuit 61 and the lower regulator circuit 62 may be selectively determined.

According to some example embodiments, the first Kelvin sensing circuit 63a connected to the first LDO regulator 62a may include the first switch S1 and the second switch S2. The first switch S1 may be connected to the second switching regulator 61b to provide feedback fb2, and the second switch S2 may be connected to the first switching regulator 61a to provide feedback fb1. A first switch control signal C1 and a second switch control signal C2 may be applied to the first switch S1 and the second switch S2, respectively. The first switch control signal C1 and the second switch control signal C2 may be output by the controller 64. A first output voltage Vo1 of the first switching regulator 61a or the first output voltage Vo2 of the second switching regulator 61b may be feedback controlled through controlling to turn on any one of the first switch S1 and the second switch S2 included in the first Kelvin sensing circuit 63a.

According to some example embodiments, an operation of the first Kelvin sensing circuit 63a may be equally applied to the second Kelvin sensing circuit 63b including third and fourth switches S3 and S4 and third and fourth switch control signals C3 and C4, the third Kelvin sensing circuit 63c including fifth and sixth switches S5 and S6 and fifth and sixth switch control signals C5 and C6, and the fourth Kelvin sensing circuit 63d including seventh and eighth switches S7 and S8 and seventh and eighth switch control signals C7 and C8.

Referring to FIG. 7, the PMIC 60 having a sub-regulation structure capable of increasing efficiency by combining a switching regulator and a linear regulator is disclosed. The LDO regulator included in the lower regulator circuit 62 according to example embodiments needs to reduce the voltage difference between both ends of the LDO regulator in order to obtain high efficiency. When the system voltage Vsys is directly connected to the LDO regulator to use, power loss occurs. Therefore, overall efficiency may be increased by supplying power to the lower regulator by reducing the system voltage Vsys using a switching regulator having a relatively high efficiency, that is, an upper regulator circuit. In some example embodiments, the sub-regulation structure may denote a structure in which the system voltage Vsys is sequentially converted and output through a switching regulator and an LDO regulator. According to some example embodiments, the sub-regulation structure may denote to a structure in which a voltage is controlled through a switching regulator to improve efficiency, rather than directly connecting the system voltage Vsys through the LDO regulator. In this way, dropout voltages of the first to fourth LDO regulators 62a to 62d included in the lower regulator circuit 62 may be improved or optimized.

According to some example embodiments, as the output current capacity of the LDO regulator continuously increases, there is a possibility that the supply voltage is reduced and deteriorated due to parasitic resistance, and thus, the improvement or optimization of the dropout voltage of the LDO regulator may be required. According to some example embodiments, the dropout voltage may be improved or optimized and the number of pins PIN may be reduced by controlling the structure of the Kelvin switch circuit 63 and a signal applied to the Kelvin switch circuit 63. The structure of the PMIC 60 according to some example embodiments may reduce the number of pins as well as reconfiguration of power rails and may thus be advantageous in a PMIC using a limited number of pins PIN.

Referring to FIG. 7, through the Kelvin switch circuit 63, an output voltage of the upper regulator circuit 61 may be detected inside the PMIC 60 instead of the outside. Therefore, in the PMIC 60 according to some example embodiments, even if a voltage reduced by printed circuit board (PCB) pattern resistors Rp3 and Rp4 and PIN resistors R_pin3 and R_pin4 is supplied to the lower regulator circuit 62, the voltage is transferred to the upper regulator circuit 61 through the Kelvin switch circuit 63 and is compensated for the voltage reduction. A signal capable of controlling whether the plurality of switches S1 to S8 included in the Kelvin switch circuit 63 is turned on may be applied from the controller 64. The structure of the Kelvin switch circuit 63 may be modified and extended from a structure including a plurality of switching regulators and LDO regulators, including the structure disclosed in FIG. 7. Therefore, the PMIC 60 according to some example embodiments may receive an accurate power supply voltage regardless of the magnitude of the output current of the LDO regulator and
may secure relatively high efficiency.

When an electronic device connected to the PMIC 60 is
determined and the specifications of the corresponding elec-
tronic device are determined, the controller 64 may fix a
connection structure between an upper regulator circuit and
a lower regulator circuit corresponding thereto and not
control to be turned on or off the switches included in the
Kelvin switch circuit 63 according to a separate operation.
For example, in the case of an electronic device A, the first
switching regulator 61a, the first LDO regulator 62a, and the
second LDO regulator 62b may be connected, and in the
case of an electronic device B, the first switching regulator
61a, the third LDO regulator 62c, and the fourth LDO
regulator 62d may be connected. The controller 64 may
control switches included in the Kelvin switch circuit 63 to
turn on or off according to a connection structure between an
upper regulator circuit and a lower regulator circuit corre-
sponding to each electronic device.

Figure 8:
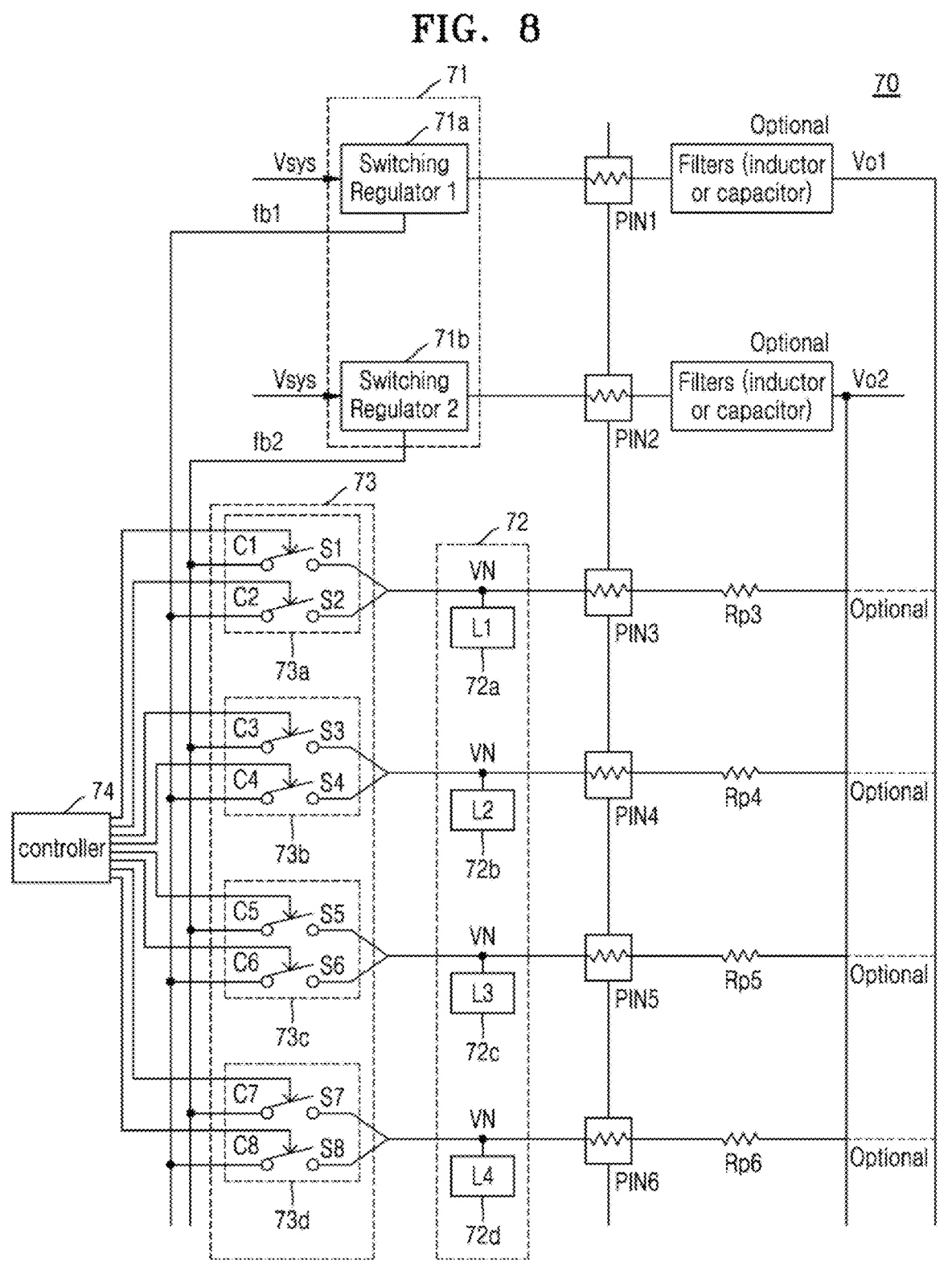

FIG. 8 is a circuit diagram illustrating a PMIC 70 accord-
ing to some example embodiments. In the description of
FIG. 8, descriptions already given with reference to FIG. 7
are omitted. For example, somewhat similar to FIG. 7,
PMIC 70 may include controller 74; upper regulator circuit
71 may include first switching regulator 71a and second
switching regulator 71b; Kelvin switch circuit 73 may
include first Kelvin sensing circuit 73a, second Kelvin
sensing circuit 73b, third Kelvin sensing circuit 73c, and
fourth Kelvin sensing circuit 73d; and lower regulator circuit
72.

Referring to FIG. 8, the number of pins PIN1 through
PIN6 between an output terminal of an upper regulator
circuit 71 and a power node VN of a lower regulator circuit
72 is different from the embodiment of FIG. 7, and the
number of PCB pattern resistors Rp3 through Rp6 are also
different.

Referring to FIG. 8, each of a first LDO regulator 72a, a
second LDO regulator 72b, a third LDO regulator 72c, and
a fourth LDO regulator 72d included in the lower regulator
circuit 72 may have a pin corresponding to each feedback
loop of the upper regulator circuit 71. Referring to FIG. 8,
a structure of the PMIC 70 in which the power pins of each
of the first LDO regulator 72a, the second LDO regulator
72b, the third LDO regulator 72c, and the fourth LDO
regulator 72d are separated from each other is shown.
Compared to FIG. 7, the number of pins is increased, but
pins corresponding to each of the LDO regulators are
included, and thus, clearer voltage detection control may be
possible.

Figure 9:
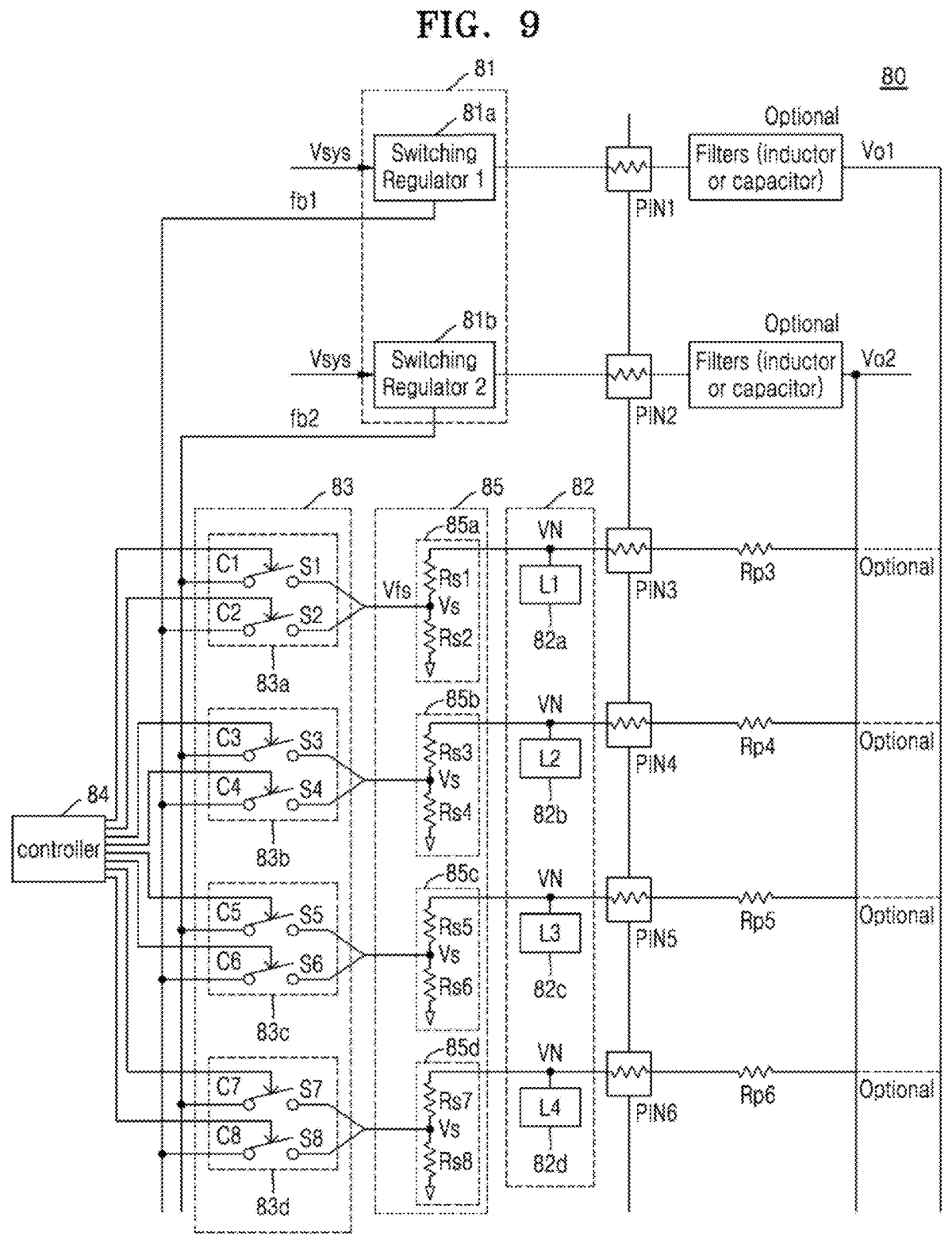

FIG. 9 is a circuit diagram illustrating a PMIC 80 accord-
ing to some example embodiments. In the description of
FIG. 9, descriptions already given with reference to FIGS. 7
and 8 are omitted. Referring to FIG. 9, a detection gain
control circuit 85 is disposed between a Kelvin switch
circuit 83 including first, second, third and fourth Kelvin
sensing circuits 83a, 83b, 83c and 83d and a lower regulator
circuit 82. Controller 84 controls first, second, third and
fourth Kelvin sensing circuits 83a, 83b, 83c and 83d. The
detection gain control circuit 85 may include a plurality of
detection gain circuits, for example, first to fourth detection
gain circuits 85a, 85b, 85c, and 85d. Each of the plurality of
detection gain circuits 85a, 85b, 85c, and 85d may be
provided to correspond to each of LDO regulators 82a, 82b,
82c, and 82d included in the lower regulator circuit 82.

According to some example embodiments, the first detec-
tion gain circuit 85a may be disposed between a first Kelvin
sensing circuit 83a and the first LDO regulator 82a. The first detection gain circuit 85a may generate a feedback voltage
Vfs proportional to a voltage of a power node VN of the first
LDO regulator 82a and transmit the feedback voltage Vfs to
an upper regulator circuit 81 including first switching regu-
lator 81a and second switching regulator 81b through the
first Kelvin sensing circuit 83a. As shown in FIG. 9, for
example, the first detection gain circuit 85a may provide a
feedback voltage Vfs corresponding to a ratio of resistance
values to the upper regulator circuit 81 using distribution
resistors Rs1 and Rs2, but the configuration of the first
detection gain circuit 85a is not limited thereto.

In FIG. 9, a relationship of Vfs=VN*Rs2/(Rs1+Rs2) is
satisfied. Here, VN may denote a voltage of the power node
VN, and the Rs1 and the Rs2 may refer to a resistance value
of the distribution resistor Rs1 and a resistance value of the
distribution resistor Rs2, respectively. The distribution resis-
tors Rs1 and Rs2 may be connected in series between the
power node VN and the ground voltage, and may be
connected to each other at a feedback node Vs. The first
detection gain circuit 85a may provide the feedback voltage
Vfs at the feedback node Vs. According to some example
embodiments, the distribution resistors Rs1 and Rs2 may be
voltage distributors that generate the feedback voltage Vfs
by dividing a voltage of the power node VN. According to
some example embodiments, in the case of a specific LDO
regulator, an operation such as increasing or decreasing a
detection gain may be required. When the detection gain
control circuit 85 is disposed between the Kelvin switch
circuit 83 and the lower regulator circuit 82, which upper
regulator of the upper regulator circuit 81 is reflected may be
determined with reference to the feedback voltage Vfs.

Although only the first detection gain circuit 85a, which
is one of the plurality of detection gain circuits 85a, 85b,
85c, and 85d in FIG. 9, has been described, it may be
understood that the description of the first detection gain
circuit 85a may be equally applied to the remaining second
detection gain circuit 85b including distribution resistors
Rs3 and Rs4, third detection gain circuit 85c including
distribution resistors Rs5 and Rs6, and fourth detection gain
circuit 85d including distribution resistors Rs7 and Rs8.

Figure 10:
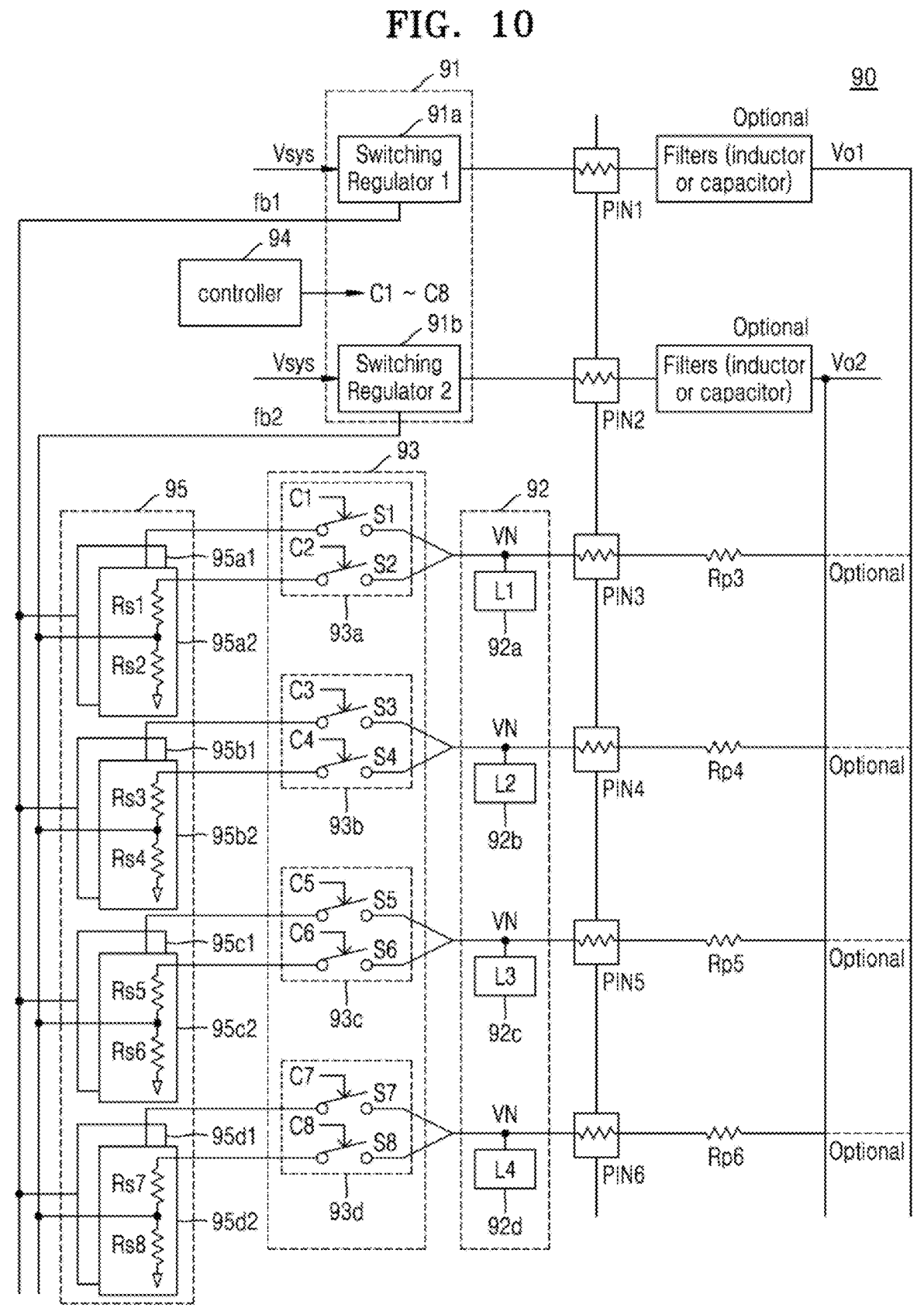

FIG. 10 is a circuit diagram illustrating a PMIC 90
according to some example embodiments. Referring to FIG.
10, the PMIC 90 may include a detection gain control circuit
95 disposed between a Kelvin switch circuit 93 including
first, second, third and fourth Kelvin sensing circuits 93a,
93b, 93c and 93d, and an upper regulator circuit 91, and also
may include lower regulator circuit 92 including first, sec-
ond, third and fourth LDO regulators 92a, 92b, 92c and 92d.
The detection gain control circuit 95 may include a plurality
of detection gain circuits, for example, first to eighth detec-
tion gain circuits 95a1, 95a2, 95b1, 95b2, 95c1, 95c2, 95d1,
and 95d2. In FIG. 10, the connection of a controller 94 is
shown not to be directly connected to the Kelvin switch
circuit 93, but the controller 94 of FIG. 10 may be connected
to switches included in the Kelvin switch circuit 93 as shown
in the drawings described above.

Referring to FIG. 10, first and second detection gain
circuits 95a1 and 95a2 corresponding to a first Kelvin
sensing circuit 93a may be provided. According to some
example embodiments, a first switch S1 included in the first
Kelvin sensing circuit 93a may be connected to a first
switching regulator 91a via the first detection gain circuit
95a1, and a second switch S2 included in the first Kelvin
sensing circuit 93a may be connected to a second switching
regulator 91b via the second detection gain circuit 95a2.

Compared with FIG. 9 in which the first detection gain
circuit 85a corresponding to the first Kelvin sensing circuit 83*a* is disclosed as being one, in FIG. 10 the detection gain circuits 95*a*1 and 95*a*2 corresponding to the first Kelvin sensing circuit 93*a* are disclosed as being two. Because the configuration of the detection gain circuits 95*a*1 and 95*a*2 is the same as that of FIG. 9, detailed description thereof is omitted.

As in FIG. 10, when the detection gain circuits 95*a*1 and 95*a*2 are disposed in front of the Kelvin switch circuit 93, because the outputs corresponding to the first switch S1 and the second switch S2 included in the first Kelvin sensing circuit 93*a* are determined, respectively, the gain may be adjusted in more detail. According to some example embodiments, a voltage detected through the Kelvin switch circuit 93 may be transmitted to the upper regulator circuit 91 after adjusting a detection gain.

Although only some of the detection gain circuits 95*a*1 and 95*a*2 among the plurality of detection gain circuits 95*a*1, 95*a*2, 95*b*1, 95*b*2, 95*c*1, 95*c*2, 95*d*1, and 95*d*2 of FIG. 10 have been described, it may be understood that the description of the detection gain circuits 95*a*1 and 95*a*2 may be equally applied to the remaining detection gain circuits 95*b*1, 95*b*2, 95*c*1, 95*c*2, 95*d*1, and 95*d*2.

Figure 11:
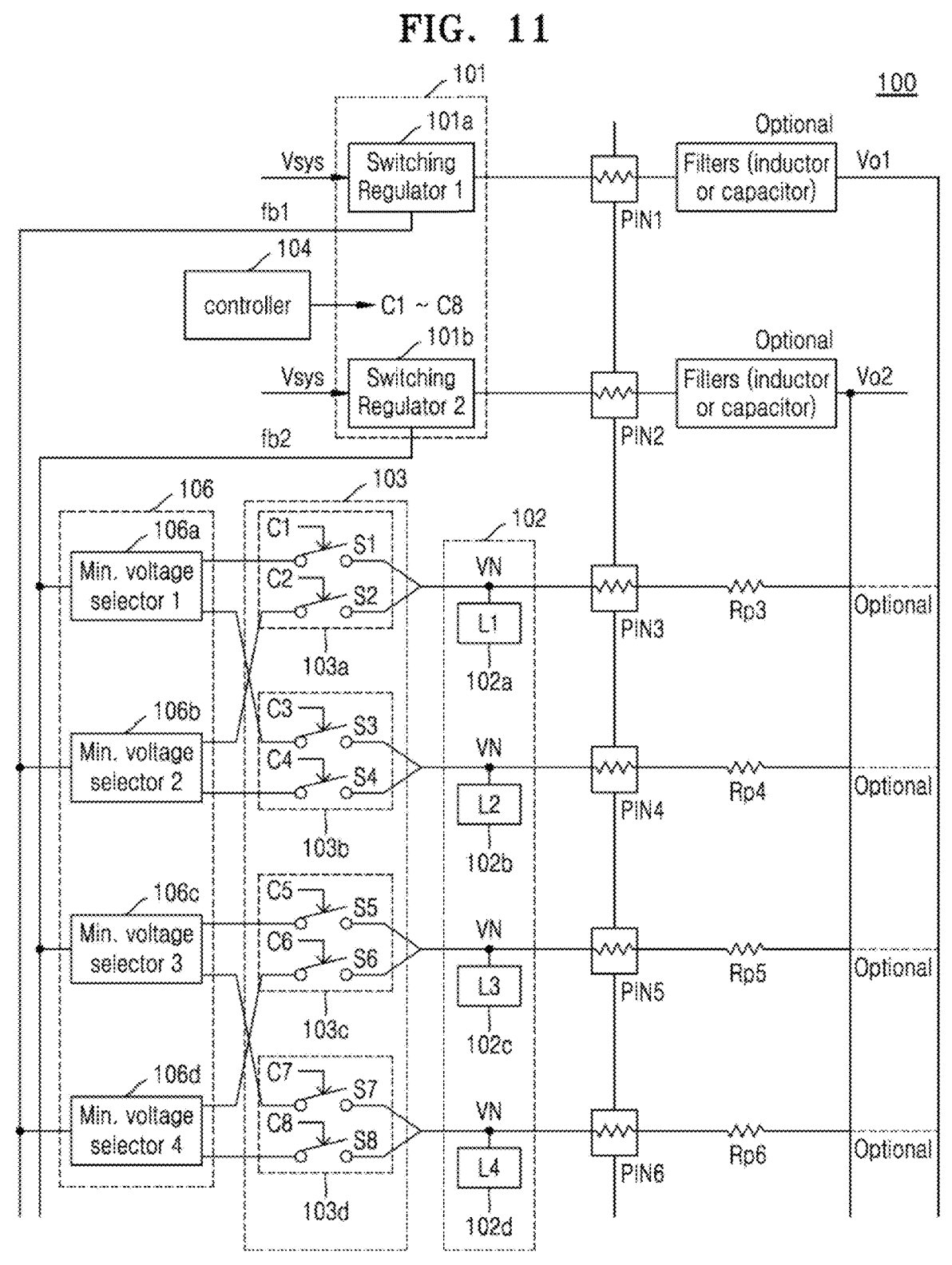

FIG. 11 is a circuit diagram illustrating a PMIC 100 according to some example embodiments. In FIG. 11, the connection of controller 104 is shown not to be directly connected to a Kelvin switch circuit 103, but the controller 104 of FIG. 11 may be connected to the switches included in Kelvin sensing circuits 103*a*, 103*b*, 103*c* and 103*d* of Kelvin switch circuit 103 as shown in the above drawings.

Referring to FIG. 11, a minimum voltage selection circuit 106 is shown. According to some example embodiments, the minimum voltage selection circuit 106 includes a first minimum voltage selector 106*a*, a second minimum voltage selector 106*b*, a third minimum voltage selector 106*c*, and a fourth minimum voltage selector 106*d*. According to some example embodiments, the minimum voltage selection circuit 106 may be disposed between an upper regulator circuit 101 and the Kelvin switch circuit 103. According to some example embodiments, each of the first to fourth minimum voltage selectors 106*a*, 106*b*, 106*c*, and 106*d* included in the minimum voltage selection circuit 106 may be connected between any one of a plurality of first and second switching regulators 101*a* and 101*b* and switches connecting to at least two or more lower regulators among a plurality of switches S1, S2, S3, S4, S5, S6, S7 and S8 included in the Kelvin switch circuit 103.

According to some example embodiments of FIG. 11, assuming that a plurality of lower regulators including LDO regulators 102*a*, 102*b*, 102*c*, and 102*d* use the output voltage of the same switching regulator 101*a* or 101*b*, the magnitude of a voltage reduced by PCB resistors Rp3 to Rp6 and PIN resistors R_pin3 to R_pin6 may be proportional to an output current of each of the lower regulators including LDO regulators 102*a*, 102*b*, 102*c* and 102*d*. Therefore, when only the Kelvin switch circuit 103 is used, an average voltage of detected voltages is fed back to the upper regulator circuit 101, and thus, the accuracy of voltage compensation may decrease.

According to some example embodiments, when both power voltages of a first LDO regulator 102*a* and a second LDO regulator 102*b* are connected to the second switching regulator 101*b*, a first switch S1 and a third switch S3 included in the Kelvin switch circuit 103 may be connected to the first minimum voltage selector 106*a*. In some example embodiments, any one of the plurality of upper regulators (i.e., the plurality of switching regulators) may form a feedback loop with at least two or more lower regulators among the plurality of lower regulators (i.e., the plurality of LDO regulators). In some example embodiments, the second switching regulator 101*b* may form a feedback loop with the first LDO regulator 102*a* and the second LDO regulator 102*b*. The first minimum voltage selector 106*a* may be connected to the second switching regulator 101*b* by controlling whether the first switch S1 and the third switch S3 are turned on to select an LDO regulator having a large voltage drop among the first LDO regulator 102*a* and the second LDO regulator 102*b*. According to some example embodiments, when the voltage drop by the first LDO regulator 102*a* is greater than the voltage drop by the second LDO regulator 102*b*, the first switch S1 may be controlled to turn on to select the first LDO regulator 102*a* and the third switch S3 may be controlled to turn off.

In the description of FIG. 11, only the first minimum voltage selector 106*a* has been described, but the mechanism of the first minimum voltage selector 106*a* may also be applied to the second minimum voltage selector 106*b*, the third minimum voltage selector 106*c*, and the fourth minimum voltage selector 106*d*.

Figure 12:
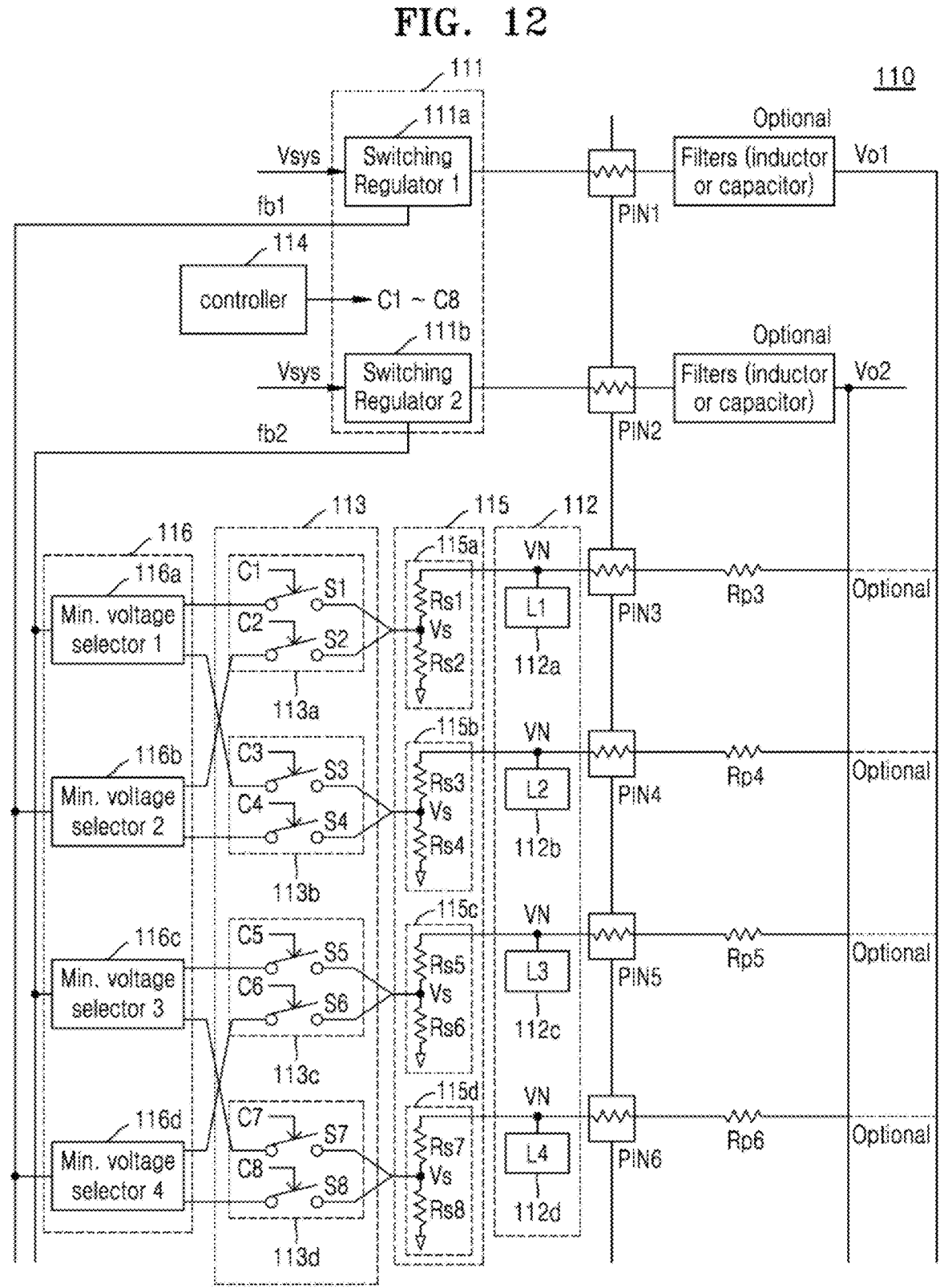
FIG. 12 is a circuit diagram illustrating a power management integrated circuit according to some example embodiments.

FIG. 12 is a circuit diagram illustrating a PMIC 110 according to some example embodiments.

The PMIC 110 according to FIG. 12 includes an upper regulator circuit 111 including first switching regulator 111*a* and second switching regulator 111*b*, a lower regulator circuit 112 including LDO regulators 112*a*, 112*b*, 112*c* and 112*d*, a Kelvin switch circuit 113 including Kelvin sensing circuits 113*a*, 113*b*, 113*c* and 113*d*, a controller 114, a detection gain control circuit 115 including detection gain circuits 115*a*, 115*b*, 115*c* and 115*d*, and a minimum voltage selection circuit 116 including minimum voltage selectors 116*a*, 116*b*, 116*c* and 116*d*. In FIG. 12, the connection of the controller 114 is shown not to be directly connected to the Kelvin switch circuit 113, but the controller 114 of FIG. 12 may be connected to the switches included in the Kelvin switch circuit 113 as shown in the above drawings.

The output voltages Vo1 and Vo2 of the upper regulator circuit 111 may be feedback-sensed via the Kelvin switch circuit 113, the detection gain control circuit 115, and the minimum voltage selection circuit 116. In FIG. 12, it is depicted that the upper regulator circuit 111 includes two switching regulators and the lower regulator circuit 112 includes four LDO regulators, but the number of switching regulators and the number of LDO regulators applicable in some example embodiments are not limited thereto.

Figure 13:
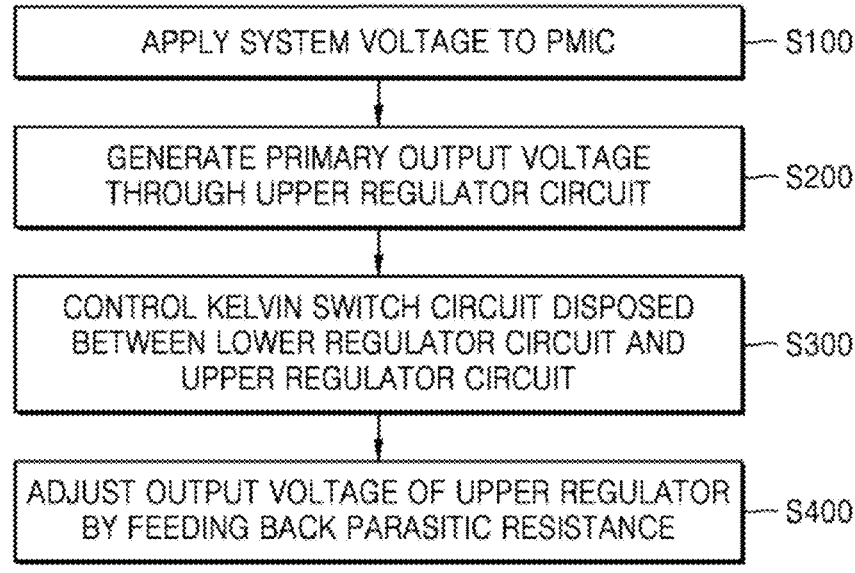
FIG. 13 is a flowchart illustrating a method of operating a power management integrated circuit, according to some example embodiments.

FIG. 13 is a flowchart illustrating a method of operating a PMIC, according to some example embodiments.

In operation S100, a system voltage may be applied to the PMIC. According to some example embodiments, the system voltage may be applied to an upper regulator circuit such as any of upper regulator circuits 11, 21, 31, 41 or 51 shown in FIGS. 2-6 for example.

In operation S200, a primary output voltage may be generated through the upper regulator circuit. The primary output voltage may be a voltage output from the system voltage via the upper regulator circuit. The primary output voltage may be at a level less than the system voltage.

In operation S300, a Kelvin switch circuit such as any of Kelvin switch circuits 13, 23, 33, 43 or 53 as shown in FIGS. 2-6 for example disposed between a lower regulator circuit such as any of lower regulator circuits 12, 22, 32, 42 or 52 and the upper regulator circuit may be controlled. Some of a plurality of switches included in the Kelvin switch circuit may be controlled to be turned on and some switches may be controlled to be turned off so that the lower regulator circuit and the upper regulator circuit are controlled to be feedback sensed. Through the control of the Kelvin switch circuit, it is possible to control any one of the plurality of lower regulators included in the lower regulator circuit and any one of the plurality of upper regulators included in the upper regulator circuit to be connected, through which a primary output voltage of the upper regulator circuit may be feedback sensed. According to some example embodiments, when a gain of a detected voltage is adjusted or a plurality of lower regulators are connected to the upper regulator, a lower regulator having the largest voltage drop may be selected. The control of the Kelvin switch circuit may be performed by a controller. The controller may control a plurality of switches included in the Kelvin switch circuit in response to power provision information corresponding to a component to which the PMIC is connected.

In operation S400, an output voltage of the upper regulator may be adjusted by feeding back parasitic resistance. Here, the parasitic resistance may denote parasitic resistance generated between the primary output voltage and a power node of the lower regulator circuit.

According to some example embodiments, the output voltage of the upper regulator circuit may be detected by connecting the Kelvin switch circuit to the power node of the lower regulator circuit, and the output voltage may be feedback controlled. According to some example embodiments, the Kelvin switch circuit may be controlled by digital logic or an internal and external switching regulation circuit, or according to some example embodiments by a controller. According to some example embodiments, a power supply voltage of the lower regulator may be connected to the upper regulator sequentially via the Kelvin switch circuit and the detection gain control circuit, or a power supply voltage of the lower regulator may be connected to the upper regulator sequentially via the detection gain control circuit and the Kelvin switch circuit. According to some example embodiments, the power supply voltage of the lower regulator using the same upper regulator may be connected to the upper regulator through the minimum voltage selection circuit after the Kelvin switch circuit, or the power supply voltage of the lower regulator using the same upper regulator may be connected to the upper regulator through the Kelvin switch circuit after the minimum voltage selection circuit.

According to a PMIC according to a Comparative Example, due to parasitic resistance present between the output voltage of the upper regulator and the input voltage of the lower regulator, for example, PCB pattern resistance, the power supply voltage may be reduced by an IR drop voltage and supplied to a linear regulator. According to the Comparative Example, because the voltage reduced by the parasitic resistance on the PCB is not detected, an actual voltage supplied to the linear regulator is reduced. Therefore, it is necessary to set the output voltage of the switching regulator high, and thus, efficiency may be reduced except for a section where the output current is maximum.

The PMIC according to some example embodiments may secure a dropout voltage of a regulator included in a lower regulator circuit regardless of high capacity current and may be reconfigured without developing hardware even if an upper regulator in the previous stage is changed.

One or more of the elements disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts has been particularly shown and described with reference to embodiments thereof, it will be understood that various changes in form and details may be made therein without departing from the spirit and scope of the following claims.

What is claimed is:

1. A power management integrated circuit comprising:
an upper regulator circuit configured to receive a system voltage as a first input and output a first output voltage;
a lower regulator circuit having the first output voltage as a second input; and
a Kelvin switch circuit connected between the upper regulator circuit and the lower regulator circuit,
wherein the Kelvin switch circuit includes a plurality of switches configured to connect any one of a plurality of upper regulators included in the upper regulator circuit to any one of a plurality of lower regulators included in the lower regulator circuit.

2. The power management integrated circuit of claim 1, further comprising a detection gain control circuit connected between the lower regulator circuit and the Kelvin switch circuit, and the detection gain control circuit configured to adjust a gain value of a feedback voltage output from the Kelvin switch circuit to the upper regulator circuit.

3. The power management integrated circuit of claim 1, further comprising a detection gain control circuit connected between the Kelvin switch circuit and the upper regulator circuit, and the detection gain control circuit configured to adjust a gain value of a feedback voltage output from the Kelvin switch circuit to the upper regulator circuit.

4. The power management integrated circuit of claim 1, further comprising a minimum voltage selection circuit connected between the Kelvin switch circuit and the upper regulator circuit, and the minimum voltage selection circuit configured to select a lower regulator from among the plurality of lower regulators having a highest voltage drop.

5. The power management integrated circuit of claim 4, wherein
any one of the plurality of upper regulators is configured to form a feedback loop with at least two or more lower regulators among the plurality of lower regulators, and
the minimum voltage selection circuit is connected between any one of the plurality of upper regulators, and switches from among the plurality of switches included in the Kelvin switch circuit connecting to the at least two or more lower regulators.

6. The power management integrated circuit of claim 1, further comprising a controller configured to output control signals to turn the plurality of switches on or off.

7. The power management integrated circuit of claim 6, wherein the controller is configured to apply the control signals to the plurality of switches in response to power provision information corresponding to a component connected to the power management integrated circuit.

8. The power management integrated circuit of claim 1, wherein
the Kelvin switch circuit includes Kelvin sensing circuits corresponding to a number of the plurality of lower regulators included in the lower regulator circuit, and
each of the Kelvin sensing circuits includes a number of switches of the plurality of switches corresponding to a number of the plurality of upper regulators included in the upper regulator circuit.

9. A power management integrated circuit comprising:
a first switching regulator and a second switching regulator each receiving a system voltage as an input;
a first low drop-output (LDO) regulator and a second LDO regulator respectively connected to a first output terminal of the first switching regulator or a second output terminal of the second switching regulator;
a first Kelvin sensing circuit connected between a first feedback voltage terminal of the first switching regulator and a first power node of the first LDO regulator, and between a second feedback voltage terminal of the second switching regulator and the first power node of the first LDO regulator; and
a second Kelvin sensing circuit connected between the first feedback voltage terminal of the first switching regulator and a second power node of the second LDO regulator, and between the second feedback voltage terminal of the second switching regulator and the second power node of the second LDO regulator.

10. The power management integrated circuit of claim 9, wherein
the first Kelvin sensing circuit includes
a first switch connected between the first feedback voltage terminal of the first switching regulator and the first power node of the first LDO regulator; and
a second switch connected between the second feedback voltage terminal of the second switching regulator and the first power node of the first LDO regulator, and
the second Kelvin sensing circuit includes
a third switch connected between the first feedback voltage terminal of the first switching regulator and the second power node of the second LDO regulator; and
a fourth switch connected between the second feedback voltage terminal of the second switching regulator and the second power node of the second LDO regulator.

11. The power management integrated circuit of claim 10, further comprising:
a first minimum voltage selector connected between the first feedback voltage terminal of the first switching regulator, and the first switch and the third switch; and
a second minimum voltage selector connected between the second feedback voltage terminal of the second switching regulator, and the second switch and the fourth switch,
wherein the first minimum voltage selector and the second minimum voltage selector are configured to select an LDO regulator from among the first LDO regulator and the second LDO regulator having a highest voltage drop.

12. The power management integrated circuit of claim 10, further comprising:
a first detection gain control circuit connected between the first Kelvin sensing circuit and the first power node of the first LDO regulator, and the first detection gain control circuit including a plurality of first resistors; and
a second detection gain control circuit connected between the second Kelvin sensing circuit and the second power node of the second LDO regulator, and the second detection gain control circuit including a plurality of second resistors.

13. The power management integrated circuit of claim 10, further comprising:
a first detection gain control circuit connected between the first Kelvin sensing circuit, and each of the first feedback voltage terminal of the first switching regulator and the second feedback voltage terminal of the second switching regulator, respectively, and the first detection gain control circuit is configured to adjust a first gain value of a first feedback voltage output from the first LDO regulator to the first feedback voltage terminal of the first switching regulator and the second feedback voltage terminal of the second switching regulator; and
a second detection gain control circuit connected between the second Kelvin sensing circuit, and each of the first feedback voltage terminal of the first switching regulator and the second feedback voltage terminal of the second switching regulator, respectively, and the second detection gain control circuit is configured to adjust a second gain value of a second feedback voltage output from the second LDO regulator to the first feedback voltage terminal of the first switching regulator and the second feedback voltage terminal of the second switching regulator.

14. The power management integrated circuit of claim 10, further comprising a controller configured to output switch control signals to the first switch, the second switch, the third switch, and the fourth switch respectively to control the first switch, the second switch, the third switch, and the fourth switch on or off.

15. The power management integrated circuit of claim 14, wherein the controller is configured to output the switch control signals in response to power provision information corresponding to a component connected to the power management integrated circuit.

16. The power management integrated circuit of claim 14, further comprising:
a first minimum voltage selector connected between the first feedback voltage terminal of the first switching regulator, and the first switch and the third switch; and
a second minimum voltage selector connected between the second feedback voltage terminal of the second switching regulator, and the second switch and the fourth switch,
wherein the controller is configured to control the first switch, the second switch, the third switch, and the fourth switch, and the first minimum voltage selector and the second minimum voltage selector are configured to compare voltage drop values at each of the first LDO regulator and the second LDO regulator, and to select an LDO regulator from among the first LDO regulator and the second LDO regulator having a greater voltage drop value.

17. A method of operating a power management integrated circuit, the method comprising:
applying a system voltage to an upper regulator circuit;
generating a primary output voltage through the upper regulator circuit; and
feedback-sensing the primary output voltage by controlling a Kelvin switch circuit connected between a lower regulator circuit to which the primary output voltage is applied and the upper regulator circuit.

18. The method of claim 17, wherein the feedback-sensing of the primary output voltage includes feedback sensing by controlling connecting of any one of a plurality of lower regulators included in the lower regulator circuit with any one of a plurality of upper regulators included in the upper regulator circuit.

19. The method of claim 18, wherein the controlling of the connecting of any one of the plurality of lower regulators included in the lower regulator circuit with any one of the plurality of upper regulators included in the upper regulator circuit comprises controlling a plurality of switches included in the Kelvin switch circuit, and wherein the controlling the plurality of switches is in response to power provision information corresponding to a component to which the power management integrated circuit is connected.

20. The method of claim 17, wherein the feedback-sensing of the primary output voltage includes sensing by feeding back parasitic resistance existing between the upper regulator circuit and the lower regulator circuit.

\* \* \* \* \*